US011935520B1

(12) United States Patent
Shoebridge et al.

(10) Patent No.: US 11,935,520 B1
(45) Date of Patent: Mar. 19, 2024

(54) IDENTIFYING SHIFTS IN AUDIO CONTENT VIA MACHINE LEARNING

(71) Applicant: Auddia Inc., Boulder, CO (US)

(72) Inventors: Peter Shoebridge, Boulder, CO (US); Jeffrey Thramann, Longmont, CO (US); Pablo Calderon Rodriguez, Boulder, CO (US)

(73) Assignee: Auddia Inc., Boulder, CO (US)

( * ) Notice: Subject to any disclaimer, the term of this patent is extended or adjusted under 35 U.S.C. 154(b) by 184 days.

(21) Appl. No.: 17/123,761

(22) Filed: Dec. 16, 2020

Related U.S. Application Data

(60) Provisional application No. 62/949,228, filed on Dec. 17, 2019.

(51) Int. Cl.
*G10L 15/16* (2006.01)
*G06N 20/00* (2019.01)
*G10L 15/08* (2006.01)

(52) U.S. Cl.
CPC .............. *G10L 15/16* (2013.01); *G06N 20/00* (2019.01); *G10L 2015/081* (2013.01)

(58) Field of Classification Search
CPC .... G10L 15/16; G10L 2015/081; G06N 20/00
See application file for complete search history.

(56) References Cited

U.S. PATENT DOCUMENTS

| | | | | |
|---|---|---|---|---|
| 7,174,293 B2* | 2/2007 | Kenyon | ................. | G06Q 30/02 704/231 |
| 8,209,713 B1* | 6/2012 | Lai | .................... | H04N 21/4383 725/18 |
| 10,652,298 B2* | 5/2020 | Thomas | ................. | H04L 67/04 |
| 2007/0016918 A1* | 1/2007 | Alcorn | ............. | H04M 3/42221 725/18 |
| 2010/0042412 A1* | 2/2010 | Aronowitz | ............. | G10L 25/87 704/E11.001 |
| 2013/0318114 A1* | 11/2013 | Emerson, III | ........ | G10L 19/018 707/758 |
| 2014/0052770 A1* | 2/2014 | Gran | ................. | H04N 21/8586 709/203 |
| 2015/0271598 A1* | 9/2015 | Thompson | ............ | H03J 1/0058 381/2 |
| 2015/0341410 A1* | 11/2015 | Schrempp | ............. | H04L 65/765 709/231 |

(Continued)

OTHER PUBLICATIONS

Herley, Cormac, "ARGOS: Automatically extracting repeating objects from multimedia streams." IEEE Transactions on multimedia 8.1 (2006): pp. 115-129 (Year: 2006).*

(Continued)

*Primary Examiner* — Jesse S Pullias
*Assistant Examiner* — Michael C. Lee
(74) *Attorney, Agent, or Firm* — Perkins Coie LLP

(57) ABSTRACT

A method and system for identifying the beginning and ending of songs via a machine learning analysis. A machine learning model analyzes streaming audio (such as a radio broadcast) in overlapping, 3-second samples. Each sample is labeled into groups such as "song," "talk," "commercial" and "transition." Based on the location of the transition samples, an exact second a given song begins and ends in the audio stream is derivable. The model further identifies when two songs shift between one another.

14 Claims, 3 Drawing Sheets

(56) References Cited

U.S. PATENT DOCUMENTS

| | | | |
|---|---|---|---|
| 2018/0121159 A1* | 5/2018 | Thompson | H04N 21/466 |
| 2018/0314979 A1* | 11/2018 | Talwar | G06N 20/00 |
| 2019/0102458 A1* | 4/2019 | Roblek | G06N 3/08 |
| 2020/0021375 A1* | 1/2020 | Stavrowsky | G10L 15/22 |

OTHER PUBLICATIONS

Muller-Cajar, Robin, Univ. of Canterbury, student thesis entitled Detecting Advertising in Radio using Machine Learning, 2007, pp. 1-34. (Year: 2007).*

Shah, Rohan, et al. "Efficient Broadcast Monitoring using Audio Change Detection." IICAI. 2011. (Year: 2011).*

Koolagudi, Shashidhar G., et al. "Advertisement detection in commercial radio channels." 2015 IEEE 10th International Conference on Industrial and Information Systems (ICIIS). IEEE, 2015, pp. 272-277 (Year: 2015).*

SHOUTcast XML Metadata Specification, available on archive.org as of Jan. 17, 2016, https://web.archive.org/web/20160117174300/http://wiki.shoutcast.com/index.php?title=SHOUTcast_XML_Metadata_Specification&oldid=74966 (Year: 2016).*

Senevirathna, ED Nishan W., et al. "Audio music monitoring: Analyzing current techniques for song recognition and identification." GSTF Journal on Computing (JoC) 4 (2015): pp. 1-12 (Year: 2015).*

Jung, Young Hoon, et al. "A Probabilistic Ranking Model for Audio Stream Retrieval." Proceedings of the 1st International Workshop on Multimedia Analysis and Retrieval for Multimodal Interaction. 2016, pp. 33-38 (Year: 2016).*

Senevirathna, E. D. N. W., et al. "Radio Broadcast Monitoring to Ensure Copyright Ownership." The International Journal on Advances in ICT for Emerging Regions 11.1 (2018), pp. 1-11 (Year: 2018).*

Cano, Pedro, et al. "Robust sound modeling for song detection in broadcast audio." Proc. AES 112th Int. Conv (2002): pp. 1-7. (Year: 2002).*

Baluja, Shumeet, et al. "Waveprint: Efficient wavelet-based audio fingerprinting." Pattern recognition 41.11 (2008): pp. 3467-3480 (Year: 2008).*

* cited by examiner

IDENTIFYING SHIFTS IN AUDIO CONTENT VIA MACHINE LEARNING

PRIORITY CLAIM

This application claims priority to U.S. Provisional Patent Application No. 62/949,228, filed Dec. 17, 2019, the entire contents of which is incorporated herein by reference.

TECHNICAL FIELD

The disclosure relates to identification of a character of audio content during an audio stream and more specifically to identifying transitions between identifiably different audio content.

BACKGROUND

Radio broadcasts often include segments of music, commentary, and commercials. Listeners are often not interested in listening to the commercial segments. While users may turn down the volume or change the channel, these actions do not occur automatically based on computer analysis. Responses to commercials during radio broadcasts are human intensive.

DETAILED DESCRIPTION

The analysis of an audio stream in order to identify useful fragments of audio combines predictions from various convolutional neural networks (CNN) and the usage of the metadata provided by the stream. The second is used to determine what snippets of audio must be submitted to the machine learning (ML) models and to run a probabilistic analysis on the results from the ML models.

A specialized CNN is trained to classify 3-second samples into categories including: songs, DJ talk, or commercial content. The 3-second samples are represented by using a Mel-Frequency Cepstral Coefficients (MFCCs) feature extraction method based on distributed Discrete Cosine Transform (DCT-II). A second CNN (binary) is trained to determine whether two 6-second samples belong to the same song. The system uses the second CNN to identify when there has been a transition between two consecutive songs.

The information from the audio stream metadata is used to isolate the fragments of audio where the transition between classes or consecutive are very likely to occur and therefore should be analyzed by the suitable ML model. A post-ML analysis based on hidden Markov models (HMM) is performed on the raw sequence of predictions from the ML model. The HMM is constructed from the statistical analysis of hours of radio streams. The result is the most likely label sequence, which the system uses to extract the segments with the desired labels.

Figure 1:
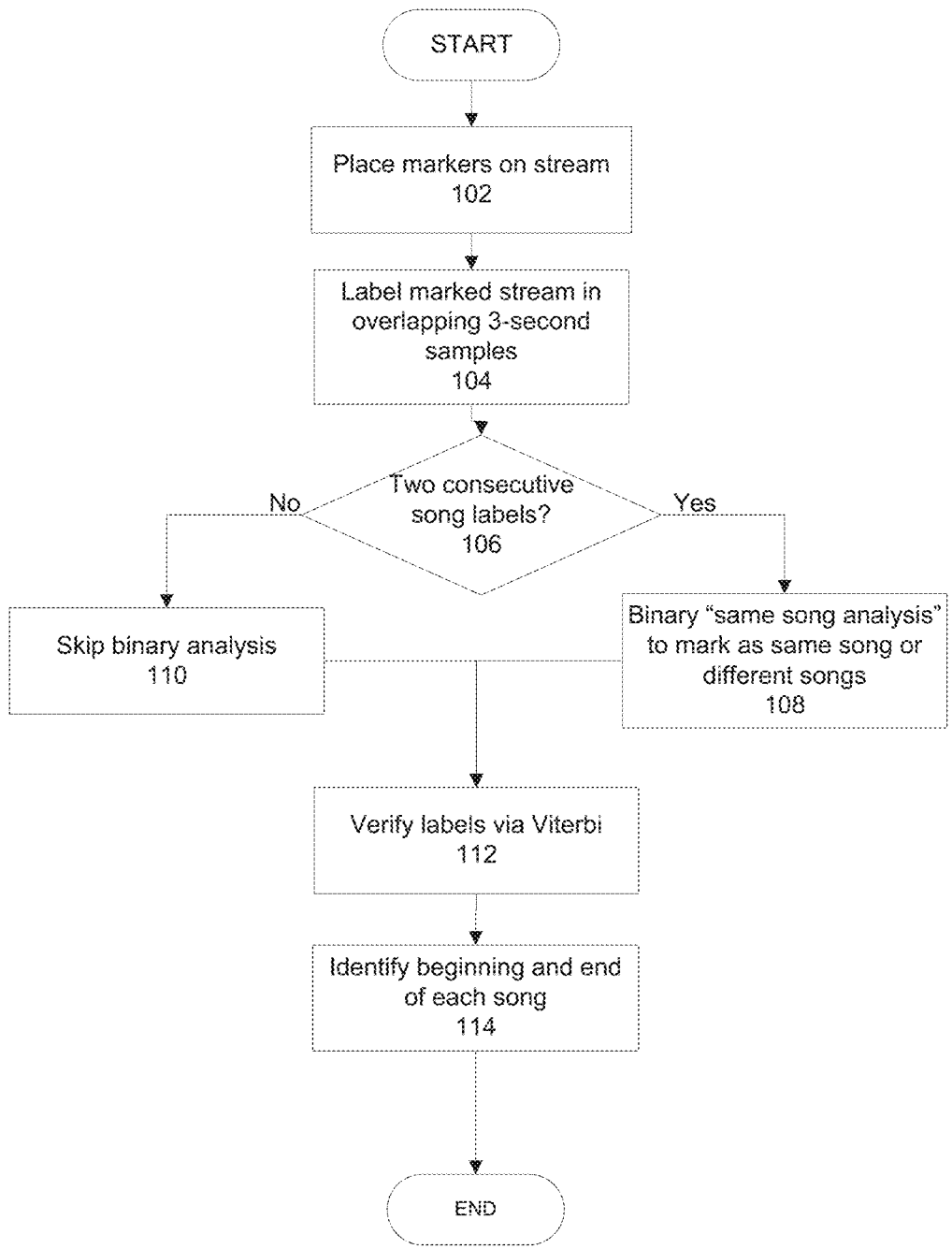
FIG. 1 is a flowchart illustrating a method of identifying the beginning of an audio segment within an audio stream.

FIG. 1 is a flowchart illustrating a method of identifying the beginning of an audio segment within an audio stream. In step 102, the system places markers in the audio stream around which an analyzed segment may start. The stream metadata provides markers with a known (or at least estimable) degree of uncertainty. The system processes the metadata over a representative sample of audio streams. The markers are placed both before and after the appearance of the metadata. For example, based on one analysis, positioning the markers nineteen seconds before the metadata issues and 29 seconds after the metadata issues has a 0.95 probability to include the beginning of a song. This range may change or be expanded to increase the probability of finding the transition contained in the window.

In step 104, the system executes ML model(s) of the segment. The model is fed overlapping 3 second samples of audio in 1 second intervals (e.g., 0:00-0:03, 0:01-0:04, and 0:02-0:05). The model outputs a label (e.g., song, talk, commercial) for each sample. The labels are based on the MFCC of each sample.

In step 106, the system identifies whether a previous sample prior to a current sample is labeled as a song. In step 108, where the previous sample of audio is a song, the system inputs pairs of samples of 6-seconds to the binary model. These pairs are created from two 3-second samples that are positioned contiguously (e.g., 0:00-0:03 and 0:03-0:06). 6-second sample sequences pair a sample with the one corresponding to a number of seconds (steps) prior in the sequence. An output of 0 indicates the samples belong to different songs, and 1 indicates the samples belong to the same song.

The binary analysis identifies the second a song transitions to another song. For example, say a song transitions during 0:06. At 0:00-0:03, there is no prior sample to compare, no binary analysis. At 0:01-0:04, the prior sample is a song, but there is no prior contiguous sample, mark as 1. At 0:04-0:07, the prior sample is a song, and the prior contiguous sample is the same song, mark as 1. At 0:05-0:08, the prior sample is a song, and the prior contiguous sample 0:01-0:04 is the same song, mark as 1. At 0:06-0:09, the prior sample is a song, and the prior contiguous sample 0:02-0:05 is no longer the same song, mark as 0. As the first marked 0, the transition between songs begins within the first second of the subject sample, or somewhere between 0:06 and 0:07.

In step 110, where the previous sample is not a song or if there is no previous sample (e.g., the current sample is the first marker in the metadata processed, or there is no assigned state for the previous sample), no binary analysis is performed.

In step 112, the system verifies model output by executing a categorical Viterbi algorithm. Besides the predictions from the ML model the Viterbi algorithm makes use of observation probabilities, transition probabilities, and initial probabilities.

Observation probabilities (OP). A matrix that expresses the correlation between the predicted labels and the actual sample label. Each model (state classification or binary) has its own respective OP matrix and it is inferred from the machine learning process and provided to the system.

Transition probabilities (TP). A matrix that expresses the probability of changing from one state to another (or remain in the same state) given two consecutive samples. These probabilities are inferred from existence of known transitions (and probably only one) in the analyzed time window. Formulas to calculate the probabilities are identified for each possible transition. Transitions are identified in table 1 for the state model and table 2 for the binary model.

TABLE 1

| song to song prob. | song to ad prob. | song to transition prob. |
|---|---|---|
| ad to song prob. | ad to ad prob. | ad to transition prob. |
| transition to song prob. | transition to ad prob. | transition to transition prob. |

"transition" in context of the table refers to a given 3 second sample that includes two states.

TABLE 2

| mismatch to mismatch prob. | mismatch to match prob. |
|---|---|
| match to mismatch prob. | match to match prob. |

Initial probabilities (IP) are an array with the probability of each state in the first sample. This is inferred from the knowledge of the most likely previous state. If the previous state is unknown, then assign equal probabilities to each state. These arrays are known to the system for each possible transition.

In order to provide an acceptable accuracy, the Viterbi algorithm makes use of a certain number of raw predictions back (e.g., 30 seconds look back) and ahead (e.g., 20 seconds look ahead) of the predictions that are being verified according to the model, which means the analysis is performed some amount of time behind the real stream (e.g., 20 seconds).

At the beginning of streaming audio, there are no predictions to look back. Thus, the system starts with 0 look back, and increments until the system reaches 30 seconds. From that point on, the system feeds the last 30 seconds before the predictions being verified, or "smoothed." That is, at time t, to verify time t-20, the system uses predictions from t-50 to t.

In step 114, the system identifies the beginning and end of each song based on the assigned states from the ML classification. Most transitions that begin or end songs are present in three samples. The last second of a first sample, the second (numerical) second (temporal) of the second sample, and the first second of a third sample. Where there are three samples including a transition, the beginning of a song is narrowed to a second of air time based on the one second those three samples have in common. Where the transition is present in fewer samples (e.g., because the samples are at the beginning or end of a segment), the exact second is still derivable based on the overlap and the exclusion of overlap with other samples. Once the exact second a transition occurs is identified, the system may perform a similar analysis of smaller gaps in time (fractions of a second) in order to identify when during that second the transition occur in order to make precise cuts in the audio segment.

Figure 2:
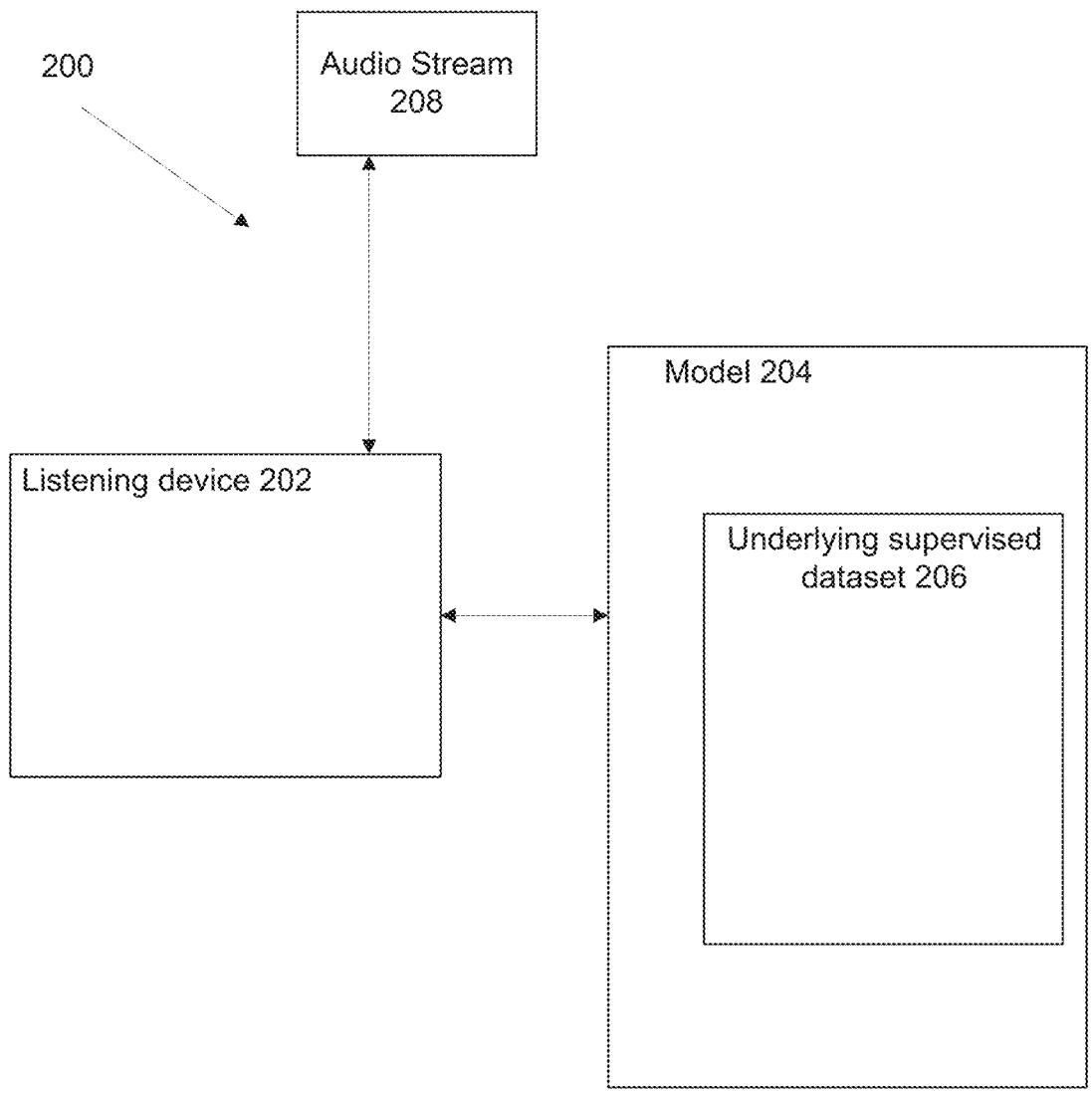
FIG. 2 is a block diagram of an audio analysis system.

FIG. 2 is a block diagram of an audio analysis system 200. The audio analysis system 200 includes a listening device 202 that communicates with a machine learning model 204. The machine learning model 204 includes an underlying supervised dataset 206. An audio stream 208 is fed into the listening device 202 which communicates the audio stream in 3-second samples to the model 204.

The underlying supervised dataset 206 includes a significant number of 3-second samples arranged in order and given human-provided labels associated with an observed MFCC. The samples are arranged in consecutive order in the underlying supervised dataset in order to train label transition probabilities for the Viterbi algorithm. The underlying supervised dataset 206 may include additional details associated with samples including time or day and station classification.

Figure 3:
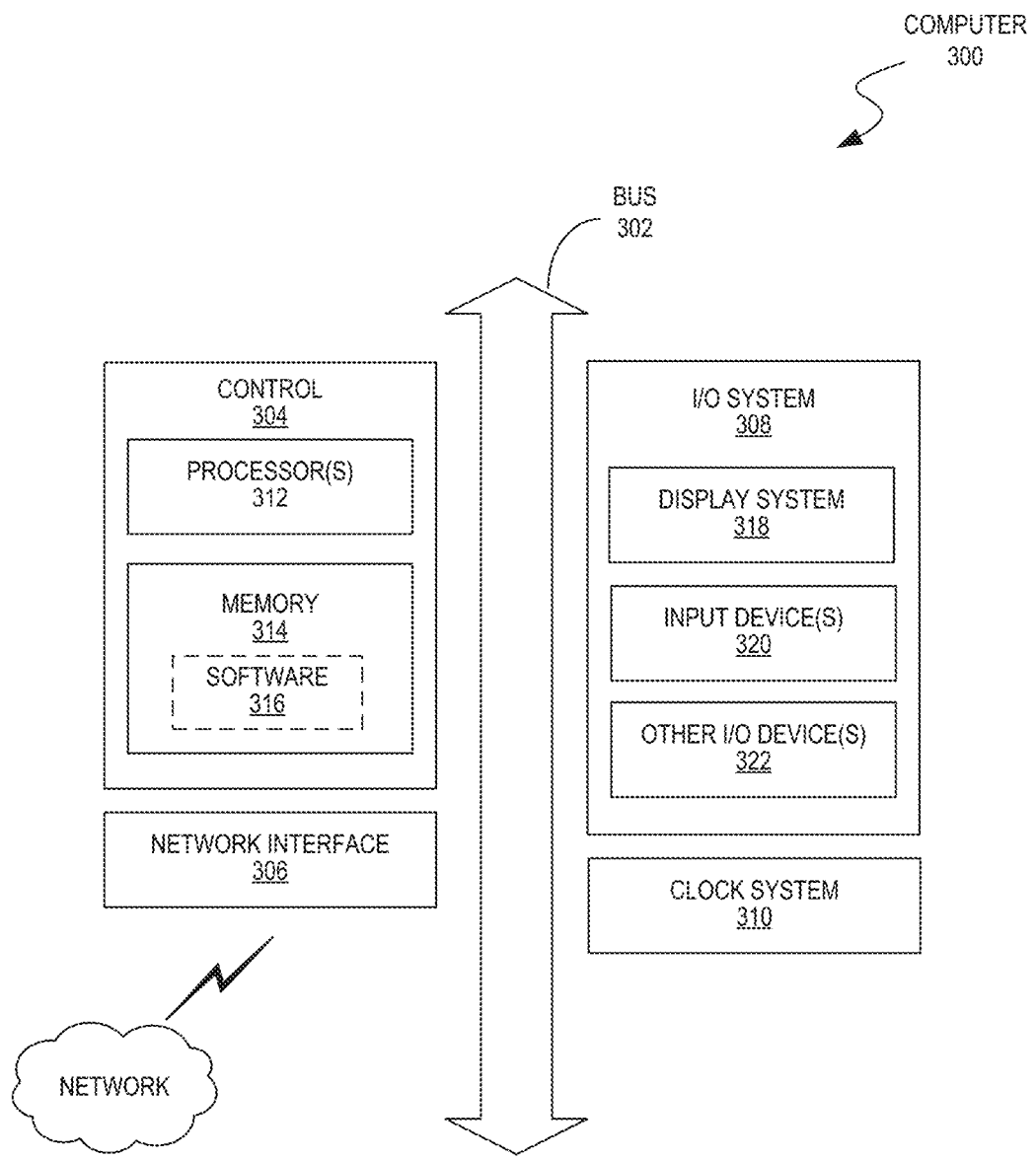
FIG. 3 is a block diagram of a computer operable to implement the disclosed technology according to some embodiments of the present disclosure.

FIG. 3 is a block diagram of a computer 300 operable to implement the disclosed technology according to some embodiments of the present disclosure. The computer 300 may be a generic computer or a computer specifically designed to carry out features of the translation system. For example, the computer 300 may be a system-on-chip (SOC), a single-board computer (SBC) system, a desktop or laptop computer, a kiosk, a mainframe, a mesh of computer systems, a handheld mobile device, or combinations thereof.

The computer 300 may be a standalone device or part of a distributed system that spans multiple networks, locations, machines, or combinations thereof. In some embodiments, the computer 300 operates as a server computer or a client device in a client—server network environment, or as a peer machine in a peer-to-peer system. In some embodiments, the computer 300 may perform one or more steps of the disclosed embodiments in real time, near real time, offline, by batch processing, or combinations thereof.

As shown in FIG. 3, the computer 300 includes a bus 302 that is operable to transfer data between hardware components. These components include a control 304 (e.g., processing system), a network interface 306, an input/output (I/O) system 308, and a clock system 310. The computer 300 may include other components that are not shown nor further discussed for the sake of brevity. One who has ordinary skill in the art will understand elements of hardware and software that are included but not shown in FIG. 3.

The control 304 includes one or more processors 312 (e.g., central processing units (CPUs)), application-specific integrated circuits (ASICs), and/or field-programmable gate arrays (FPGAs), and memory 314 (which may include software 316). For example, the memory 314 may include volatile memory, such as random-access memory (RAM), and/or non-volatile memory, such as read-only memory (ROM). The memory 314 can be local, remote, or distributed.

A software program (e.g., software 316), when referred to as "implemented in a computer-readable storage medium," includes computer-readable instructions stored in the memory (e.g., memory 314). A processor (e.g., processor 312) is "configured to execute a software program" when at least one value associated with the software program is stored in a register that is readable by the processor. In some embodiments, routines executed to implement the disclosed embodiments may be implemented as part of an operating system (OS) software (e.g., Microsoft Windows® and Linux®) or a specific software application, component, program, object, module, or sequence of instructions referred to as "computer programs."

As such, the computer programs typically comprise one or more instructions set at various times in various memory devices of a computer (e.g., computer 300), which, when read and executed by at least one processor (e.g., processor 312), will cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., memory 314).

The network interface 306 may include a modem or other interfaces (not shown) for coupling the computer 300 to other computers over the network. The I/O system 308 may operate to control various I/O devices, including peripheral devices, such as a display system 318 (e.g., a monitor or touch-sensitive display) and one or more input devices 320 (e.g., a keyboard and/or pointing device). Other I/O devices 322 may include, for example, a disk drive, printer, scanner, or the like. Lastly, the clock system 310 controls a timer for use by the disclosed embodiments.

Operation of a memory device (e.g., memory 314), such as a change in state from a binary one (1) to a binary zero (0) (or vice versa), may comprise a visually perceptible physical change or transformation. The transformation may comprise a physical transformation of an article to a different state or thing. For example, a change in state may involve accumulation and storage of a charge or a release of a stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A method for identifying an audio segment as part of an audio stream comprising:
   inserting at least two initial markers in the audio segment of the audio stream to generate a marked audio segment;
   evaluating the marked audio segment with a trained machine learning model via successive inspection of consecutive audio samples of the marked audio segment, the trained machine learning model configured to output whether each given audio sample is associated with a song portion of the audio segment;
   outputting, by the trained machine learning model, a label for each of the consecutive audio samples of the marked audio segment;
   identifying a set of consecutive audio samples as having song portion labels, wherein the set of consecutive audio samples includes a prior consecutive audio sample and a subject audio sample that partially overlap;
   determining, via the trained machine learning model, whether the set of consecutive audio samples are the same song based on a comparison of audio content of a set of contiguous audio samples, including:
      comparing, via the trained machine learning model, audio content of a prior contiguous audio sample and a subject audio sample, wherein the prior contiguous audio sample shares a common time border with the subject audio sample;
      performing a comparative audio content analysis and outputting a binary value indicating whether the compared samples include entirely the same song; and
      in response to an indication that the compared samples include multiple songs, triggering a successive comparison of consecutive overlapping audio samples bounded by the prior contiguous sample and the subject audio sample that identifies a transition second between multiple songs.

2. The method of claim 1, further comprising:
   identifying a second set of consecutive audio samples as having at least one non-song portion label; and
   in response to identification that the second set of consecutive audio samples having at least one non-song portion label, verifying the labels via a Viterbi algorithm inspection of labels assigned to other audio samples both temporally forward and behind of the second set of audio samples.

3. The method of claim 1, further comprising:
   identifying a second set of consecutive audio samples as having at least one transition label, wherein a transition label indicates the presence of two states in a single audio sample; and
   in response to identification that the second set of consecutive audio samples includes a transition label, determining, via the trained machine learning model, a transition time between two different states through use of consecutive overlapping audio samples.

4. The method of claim 1, wherein each successive inspection of consecutive audio segments further comprises:
   advancing a frame of inspection by a temporal period that is shorter than a temporal length of each audio sample.

5. The method of claim 4, wherein the successive inspections overlap by 1 second.

6. A computer device for identifying an audio segment as part of an audio stream, comprising:
   a processor; and
   a non-transitory computer-readable medium having stored thereon instructions that, when executed by the processor, cause the processor to perform operations including:
      inserting at least two initial markers in the audio segment of the audio stream to generate a marked audio segment;
      evaluating the marked audio segment with a trained machine learning model via successive inspection of consecutive audio samples of the marked audio segment, the trained machine learning model configured to output whether each given audio sample is associated with a song portion of the audio segment;

outputting, by the trained machine learning model, a label for each of the consecutive audio samples of the marked audio segment;

identifying a set of consecutive audio samples as having song portion labels wherein the set of consecutive audio samples includes a prior consecutive audio sample and a subject audio sample that partially overlap;

determining, via the trained machine learning model, whether the set of consecutive audio samples are the same song based on a comparison of audio content of a set of contiguous audio samples, including:

comparing, via the trained machine learning model, audio content of a prior contiguous audio sample and a subject audio sample, wherein the prior contiguous audio sample shares a common time border with the subject audio sample;

performing a comparative audio content analysis and outputting a binary value indicating whether the compared samples include entirely the same song; and in response to an indication that the compared samples include multiple songs, triggering a successive comparison of consecutive overlapping audio samples bounded by the prior contiguous sample and the subject audio sample that identifies a transition second between multiple songs.

7. The computer device of claim 6, the instructions further comprising:

identifying a second set of consecutive audio samples as having at least one non-song portion label; and in response to identification that the second set of consecutive audio samples having at least one non-song portion label, verifying the labels via a Viterbi algorithm inspection of labels assigned to other audio samples both temporally forward and behind of the second set of audio samples.

8. The computer device of claim 6, the instructions further comprising:

identifying a second set of consecutive audio samples as having at least one transition label, wherein a transition label indicates the presence of two states in a single audio sample; and in response to identification that the second set of consecutive audio samples includes a transition label, determining, via the trained machine learning model, a transition time between two different states through use of consecutive overlapping audio samples.

9. The computer device of claim 6, wherein each successive inspection of consecutive audio segments further comprises:

advancing a frame of inspection by a temporal period that is shorter than a temporal length of each audio sample.

10. A non-transitory computer-readable medium having stored thereon instructions that, when executed by one or more processors, cause the one or more processor to perform operations for identifying an audio segment as part of an audio stream including:

inserting at least two initial markers in the audio segment of the audio stream to generate a marked audio segment;

evaluating the marked audio segment with a trained machine learning model via successive inspection of consecutive audio samples of the marked audio segment, the trained machine learning model configured to output whether each given audio sample is associated with a song portion of the audio segment;

outputting, by the trained machine learning model, a label for each of the consecutive audio samples of the marked audio segment;

identifying a set of consecutive audio samples as having song portion labels, wherein the set of consecutive audio samples includes a prior consecutive audio sample and a subject audio sample that partially overlap;

determining, via the trained machine learning model, whether the set of consecutive audio samples are the same song based on a comparison of audio content of a set of contiguous audio samples, including:

comparing, via the trained machine learning model, audio content of a prior contiguous audio sample and a subject audio sample, wherein the prior contiguous audio sample shares a common time border with the subject audio sample;

performing a comparative audio content analysis and outputting a binary value indicating whether the compared samples include entirely the same song; and in response to an indication that the compared samples include multiple songs, triggering a successive comparison of consecutive overlapping audio samples bounded by the prior contiguous sample and the subject audio sample that identifies a transition second between multiple songs.

11. The computer-readable medium of claim 10, the instructions further comprising:

identifying a second set of consecutive audio samples as having at least one non-song portion label; and in response to identification that the second set of consecutive audio samples having at least one non-song portion label, verifying the labels via a Viterbi algorithm inspection of labels assigned to other audio samples both temporally forward and behind of the second set of audio samples.

12. The computer-readable medium of claim 10, the instructions further comprising:

identifying a second set of consecutive audio samples as having at least one transition label, wherein a transition label indicates the presence of two states in a single audio sample; and in response to identification that the second set of consecutive audio samples includes a transition label, determining, via the trained machine learning model, a transition time between two different states through use of consecutive overlapping audio samples.

13. The computer-readable medium of claim 10, wherein each successive inspection of consecutive audio segments further comprises:

advancing a frame of inspection by a temporal period that is shorter than a temporal length of each audio sample.

14. The computer-readable medium of claim 13, wherein the successive inspections overlap by 1 second.

* * * * *